United States Patent Office 3,318,931
Patented May 9, 1967

3,318,931
METHOD OF PRODUCING ALKYLGALLIUMS
Richard Dötzer, Nurnberg, and Friedrich Engelbrecht, Schwabach, Germany, assignors to Siemens-Schukertwerke Aktiengesellschaft, Berlin-Siemensstadt, Germany, a corporation of Germany
No Drawing. Filed May 10, 1961, Ser. No. 108,996
Claims priority, application Germany, May 14, 1960, S 68,513
4 Claims. (Cl. 260—429)

Our invention relates to a method of producing pure alkylgalliums. Such compounds are useful in the production of pure gallium metal and intermetallic gallium compounds, which are applicable in the production of electronic semiconductors, such as gallium arsenide or other semi-conducting gallium compounds of the type $GaB^V$ in which $B^V$ is an element from the fifth group of the periodic system, namely nitrogen, phosphorus, arsenic or antimony. Gallium, as obtainable from pure alkylgalliums, is also suitable as a doping agent in other semiconductor substances such as silicon or germanium.

Heretofore the following methods have been known for producing trialkylgallium:

(1) Reaction of gallium with dimethylmercury or diethylmercury. Due to the thermal instability of the higher alkylmercury compounds and since dialkylmercury compounds are extremely poisonous, this method is unsuitable for practical purposes.

(2) Reaction of gallium chloride with dialkylzinc at temperatures from 80 to 120° C. The extreme danger of spontaneous combustion of the dialkylzinc and the great light sensitivity of the higher derivatives considerably limit the usefulness of this method.

(3) Reaction of gallium halides with Grignard reagents. This method results in the precipitation of large quantities of salt which impede a complete reaction and greatly aggravate the separation of the trialkylgallium compounds. The yields, therefore, are poor. Moreover, lower alkylgallium compounds always devolve as trialkylgallium etherates.

It is an object of our invention to provide a method of producing alkylgallium compounds, particularly those of high purity, which minimizes or virtually avoids the above-mentioned disadvantages and in this respect is superior to all of the above-mentioned methods.

According to our invention, trivalent gallium compounds, also called herein gallium (III) compounds, preferably gallium halides, with the exception of gallium fluoride, are reacted with trialkylaluminum to form trialkylgallium and dialkylaluminum, in accordance with the equation:

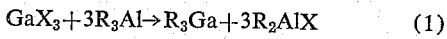

or generally in accordance with:

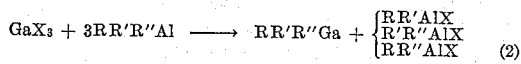

where X is an anion, and R (in Equation 1) or R, R', R'' (in Equation 2) are the same or different alkyl radicals.

Applicable gallium compounds are, for example, the following gallium halides: gallium (III)-chloride, $GaCl_3$; gallium (III)-bromide, $GaBr_3$; and gallium (III)-iodide, $GaI_3$, and compounds such as gallium-sulphate, gallium-phosphate, acetylacetonate, triacetate and ethoxy-diiso-butyl. Prior to use, the $GaCl_3$ can be purified in a current of chlorine and/or HCl. In general, those gallium compounds can be used which are free of water of crystallization and solvate of crystallization and in which the compound radical, in thermodynamic respect, has a greater affinity to aluminum than to gallium. Preferably those gallium compounds are used that can be produced in a simple manner and that can be readily purified by sublimation, recrystallizing and similar processes. Furthermore, the trialkylaluminum to be reacted can be used in purified form. Trialkylaluminumetherates are also applicable. When using higher trialkylaluminumetherates, commencing with tripropylaluminumetherate, the corresponding ether-free alkylgalliums can be obtained by thermal treatment. By etherates we mean ether is a solvate of crystallization analogous to water being a hydrate of crystallization.

Furthermore, ether-free trialkylgallium compounds can be produced from the lower trialkylgalliumetherates by fixing the ether onto aluminum trichloride, $AlCl_3$. After the reaction, thealkylgallium can be separated from the reaction mixture by fractional distillation. This is preferably done at reduced pressure. The fractional distillation can be effected with an addition of sodium fluoride which acts as a trialkylaluminum complex-forming agent. Potassium chloride can be used in a similar manner. Furthermore, the gallium compound and/or the aluminum compound can be reduced when dissolved in solvents. Applicable solvents are saturated aliphatic and/or hydro-aromatic hydrocarbons and/or ethers. Examples of aliphatic hydrocarbons suitable for such purposes are pentane, hexane, heptane and octane. These can also be used in mixture. As hydro-aromatic hydrocarbons are methylcyclopentane, cyclohexane, methyl-cyclohexane and dekalin, and mixtures thereof; ethylether, isopropylether, tetrahydrofuran and dioxane, and mixtures thereof can be used as the ether solvent.

Trialkyl gallium compounds and/or dialkylaluminum compounds are also applicable as the solvent for the reaction products. The components can be brought to reaction in a stoichiometric ratio or with an excess of trialkylaluminum. The preferred molar ratio is 1:3.2. The gallium component is added to the alkylizing medium while stirring and/or heating. For example, from the corresponding trialkylaluminum compounds the following substances can be obtained:

Trimethylgallium
Trimethylgalliumetherate
Triethylgallium
Triethylgalliumetherate
Tri-n-propylgallium
Tri-n-propylgalliumetherate
Triisopropylgallium
Triisopropylgalliumetherate
Tri-n-butylgallium
Triisobutylgallium The advantages of the method according to the invention are predicated to a great extent upon the favorable properties of the trialkylaluminum compounds being used. The trialkylaluminum compounds are neither poisonous nor light-sensitive. They are also thermally more stable than the comparable dialkyl-Zn and dialkyl-Hg compounds and the trialkyl compounds to be produced. The trialkylaluminums have a higher boiling temperature than the corresponding dialkyl-Zn, dialkyl-Hg compounds and trialkyl-Ga compounds, and therefore readily afford the evolving trialkyl-Ga compounds to be separated by distillation from the excessive trialkyl-Al and the likewise higher boiling dialkyl-Al-halide. Due to their lower vapor pressures, the trialkylaluminums are more easily manipulated and they flame less readily in air than the dialkyl-zincs. Furthermore, the trialkylaluminums are readily and well reproducible and have also been commercially available for some time. Moreover, the trialkylaluminums are also suitable as etherates for the purpose of reaction because the higher trialkyl-Ga compounds do not form distillation-stable etherates. Excessive quantities of trialkylaluminum can be completey fixed with NaF, if the distillation of trialkyl-Ga from the excess of trialkylaluminum encounters difficulties. An analogous separation of dialkylmercuries and dialkylzincs from the trialkylgalliums obtained by means of the methods mentioned in the introduction of this specification, is not possible because of the lack of complex-forming tendency of these alkyls. Another advantage of using trialkylaluminum is the fact that they constitute distillation-stable liquids which can be very well purified by fractional distillation, particularly under reduced pressure. Pure trialkyl-Al fractionated over a column and GaCl$_3$ satisfactorily sublimated in a current of HCl and/or Cl$_2$, are of sufficient purity to use for the purpose of producing highly pure trialkylgallium.

In the following a number of examples concerning the production of highly pure trialkylgalliums are described, namely the production of:

Triethylgallium (C$_2$H$_5$)$_3$Ga
Tri-n-propylgallium (n—C$_3$H$_7$)$_3$Ga
Tri-isopropylgallium (i—C$_3$H$_7$)$_3$Ga
Tri-isobutylgallium (i—C$_4$H$_9$)$_3$Ga

EXAMPLE 1

*Triethylgallium (C$_2$H$_5$)$_3$Ga*

635 g. fractionated triethyl-Al were heated to 70° C. in a 2-liter reaction vessel. A solution of 246 g. GaCl$_3$ in 400 ml. absolute n-hexane was dropwise added, while stirring, over a period of 2 to 3 hours. The solvent, thereafter, was distilled off at normal pressure. Subsequently, the triethyl-Ga was separated, under reduced pressure, from the higher boiling diethyl-Al-chloride and from excessive triethyl-Al. By rectification through a Vigreaux column, a quantity of 179.5 g. (=82% of theoretical) triethylgallium, having a boiling point of 46 to 48° C. at 18 mm. Hg, was obtained. The stated yields are always related to the amount of the gallium compounds being used.

EXAMPLE 2

*Tri-n-propylgallium (n—C$_3$H$_7$)$_3$Ga*

120 g. tri-n-propyl-Al-etherate was heated in the reaction vessel to a temperature of 60–70° C. 31.5 g. GaCl$_3$, dissolved in 90 ml. absolute n-hexane, were slowly dropwise added. Thereafter, the liquid was held, for an additional period of about 2 hours, at the same temperature (60 to 70° C.). Thereafter, the n-hexane was distilled off at normal pressure. The resulting tripropyl-Ga-etherate is obtained in a water-jet vacuum at 22 mm. Hg. Subsequently, the tripropyl-Ga-etherate is liberated by distillation through a column from its etherate-ether at 60 mm. Hg and 105 to 108° C. Fractional distillation through a Vigreaux column resulted in 28.5 g. (=80% of theoretical) colorless and ether-free tripropyl-Ga having a boiling point of 68 to 71° C. at 14 mm. Hg.

EXAMPLE 3

*Tri-isopropylgallium (i—C$_3$H$_7$)$_3$Ga*

180 g. fractionated triisopropyl-Al-etherate are placed into the reaction vessel and heated to 60 to 70° C. A solution of 45.8 g. GaCl$_3$ in 90 ml. absolute n-hexane was dropwise added during an approximate 1-hour period. After the solvent was distilled off under normal pressure, the remaining triisopropylgalliumetherate was also distilled off at 12 mm. Hg in a water-jet vacuum. During this distillation, the compound loses a portion of its etherate-ether which it subsequently fully liberates during rectification over column at 95 to 98° C. at 60 mm. Hg. Obtained were 43.7 g. (=84.5% of the theoretical value) colorless, ether-free triisopropylgallium having a boiling point of 95 to 98° C. at 60 mm. Hg.

EXAMPLE 4

*Triisobutylgallium (i—C$_4$H$_9$)$_3$*

Industrial triisobutylaluminum was subjected to high-vacuum distillation (below 0.0–1 mm. Hg), thus obtaining a pure fraction. 246 g. of this fraction were placed into the reatcion vessel. Under vigorous stirring, a quantity of 78 g. GaCl$_3$ dissolved in 150 ml. absolute n-hexane, was slowly dropwise added. Thereafter, the solvent was eliminated by distillation under normal pressure. Then the triisobutylgallium was distilled off at reduced pressure. The residue contains diisobutylaluminum chloride and an excess of triisobutylaluminum. The raw distillate was rectified through a column, and 75.5 g. (=70.6% of the theoretical value) triisobutylgallium having a boiling point of 88 to 90° C. at 10 mm. Hg was obtained.

In lieu of triisobutylaluminum, its etherate can also be employed, because triisobutylgallium no longer forms a distillation-stable etherate.

EXAMPLE 5

*Triethylgallium (C$_2$H$_5$)$_3$Ga*

(a) 105 ml. (C$_2$H$_5$)$_3$Al was heated in a reaction vessel to about 70° C. A solution of 33 g. GaCl$_3$ in 50 ml. (C$_2$H$_5$)$_2$AlCl is dropwise added under continuous stirring. The resulting (C$_2$H$_5$)$_3$Ga was distilled off at 40 mm. Hg and is subsequently fractionated over a column. Obtained were 23.4 g. (=79.6% of the theoretical value) (C$_2$H$_5$)$_3$Ga, having a boiling point of 35.5 to 37.5° C. at 11 mm. Hg.

(b) A solution of 49 g. GaCl$_3$ in 38 g. (C$_2$H$_5$)$_3$Ga was dropwise added, at about 70° C., while stirring, into a quantity of 127.3 g. (C$_2$H$_5$)$_3$Al. Thereafter the (C$_2$H$_5$)$_3$Ga was drawn off under reduced pressure and was subsequently rectified. Subtracting the quantity of (C$_2$H$_5$)$_3$Ga, which was used as a solvent, 38.5 g. (=88.1% of the theoretical value) (C$_2$H$_5$)$_3$Ga, boiling at 37.5 to 39.5° C. at 12.5 mm. Hg, were obtained.

EXAMPLE 6

*Triisobutylgallium (i—C$_4$H$_9$)$_3$Ga*

(a) 280 ml. (i—C$_4$H$_9$)$_3$Al was heated to 60 to 80° C. A solution of 64 g. GaCl$_3$ in 100 ml. (i—C$_4$H$_9$)$_2$AlCl was dropwise added under continuous stirring. Thereafter (i—C$_4$H$_9$)$_3$Ga was isolated by distillation and fractionated. There was obtained 55.5 g. (=63.4% of the theoretical value) (i—C$_4$H$_9$)$_3$Ga, having a boiling point of 86.5 to 89.5° C. at 11 mm. Hg.

(b) 48.8 g. GaCl$_3$ were dissolved in 46.9 g.

(i—C$_4$H$_9$)$_3$Ga

The solution was added while stirring, at 60 to 80° C., into 179 g. (i—C$_4$H$_9$)$_3$Al. The (i—C$_4$H$_9$)$_3$Ga was isolated by distillation and thereafter fractionated. After the (i—C$_4$H$_9$)$_3$Ga, used as a solvent, was drawn off, a quantity of 53.9 g. (=80.8% of theoretical value) of (i—C$_4$H$_9$)$_3$Ga, having a boiling point of 86 to 88° C. at 10 mm. Hg, was obtained.

EXAMPLE 7

*Triethylgallium (C$_2$H$_5$)$_3$Ga*

150 ml. triethylgallium was added to 190 g. gallium-bromide, GaBr$_3$, under cooling conditions. The resulting solution was added dropwise and under stirring to 341 ml. triethylaluminum at 60° C. Thereafter the triethylgallium was isolated by distillation in a water-jet vacuum of 10 mm. Hg and was subsequently fractionated through a Vigreaux column. After subtraction of the amount of triethylgallium, which was used as a solvent, there remained 93.2 g. (=96.7% of theoretical value) triethylgallium, having a boiling point of 38 to 40° C. at 10 mm. Hg. Gallium iodide, GaI$_3$, could have been analogously used in lieu of gallium bromide, GaBr$_3$.

EXAMPLE 8

*Triisobutylgallium (i—C$_4$H$_9$)$_3$Ga*

41.9 g. ethoxydiisobutylgallium were added dropwise under stirring at 80° C. to 43.6 g. triisobutylaluminum.

The resulting triisobutylgallium was isolated by distillation at 0.01 mm. Hg and was subsequently rectified in a water-jet vacuum through a Vigreaux column. 39.0 g. (=88.5% of theoretical value) triisobutylgallium, with a boiling point of 88° C. at 10 mm. Hg, were obtained.

EXAMPLE 9

*Triisobutylgallium* (i—$C_4H_9)_3Ga$ 28 g. triacetategallium (95% concentration) were suspended in cyclohexane, heated to 80° C., and entered dropwise under stirring into 100 ml. triisobutylaluminum. The bath was thereafter stirred for a period of 4 to 5 hours at a temperature of 70 to 80° C. Then the cyclohexane was distilled off to a great extent under normal pressure. The remainder was eliminated by distillation in water-jet vacuum. The triisobutylgallium was isolated by distillation at 0.01 mm. Hg and thereafter rectified through a Vigreaux column. 25.7 g. (=99% of theoretical value) triisobutylgallium, having a boiling point of 87–88° C. at 10 mm. Hg, was obtained.

EXAMPLE 10

*Triethylgallium* $(C_2H_5)_3Ga$ 32.7 g. anhydrous gallium-sulphate and 77.5 ml. triethylaluminum were heated under stirring, for a period of two hours, to 150 to 180° C. The resulting triethylgallium was isolated by distillation in a water-jet vacuum and was subsequently rectified over a column. 16.1 g. (=67% of theoretical value) triethylgallium, with a boiling point of 37 to 38° C. at 12 mm. Hg, were obtained.

Gallium-phosphate could have been analogously used in lieu of gallium-sulphate.

EXAMPLE 11

*Triethylgallium* $(C_2H_5)_3Ga$ 85 g. triethylaluminum were added dropwise under stirring to 67.0 g. gallium-acetylacetonate suspended in n-hexane and heated to 60 to 80° C. Subsequently, the stirring process was continued at the same temperature for a period of two hours. After cooling down, the n-hexane was distilled off at normal pressure and the triethylgallium was isolated by distillation in a water-jet vacuum. After rectification, 20.8 g. (=72.5% of theoretical value) triethylgallium, with a boiling point of 36 to 38° C. at 11 mm. Hg, were obtained.

Better yields for all the examples cited above were obtained by the application of trialkylaluminums which are free of hydride.

We claim:
1. The method of producing triisobutylgallium, which comprises slowly adding, in a molar ratio of about 1:3, ethoxydiisobutylgallium, in a suitable organic solvent, to warmed triisobutylaluminum, distilling off said solvent, thereafter fractionally distilling the rest of the reaction mixture to recover triisobutylgallium.

2. The method of producing triisobutylgallium, which comprises slowly adding, in a molar ratio of about 1:3, gallium triacetate, to warmed triisobutylaluminum in a suitable organic solvent, distilling off said solvent, thereafter fractionally distilling, at 0.01 mm. Hg, the rest of the reaction mixture to recover triisobutylgallium.

3. The method of producing triethylgallium, which comprises slowly adding, under stirring, in a molar ratio of about 1:6, gallium sulfate to warmed anhydrous triethylaluminum, and recovering the triethylgallium produced by distillation.

4. The method of producing triethylgallium, which comprises slowly adding, under stirring, in a molar ratio of about 3:1 of anhydrous triethylaluminum to gallium acetylacetonate, in an organic solvent, evaporating off said solvent and recovering the triethylgallium produced by distillation.

References Cited by the Examiner
UNITED STATES PATENTS

| | | | |
|---|---|---|---|
| 3,061,647 | 10/1962 | Jenkner | 260—429 X |
| 3,103,526 | 9/1963 | Jenkner | 260—448 |
| 3,124,604 | 3/1964 | Huther | 260—429.9 |

FOREIGN PATENTS 820,146  9/1959  Great Britain.

TOBIAS E. LEVOW, *Primary Examiner.*

T. L. IAPALUCCI, *Assistant Examiner.*